United States Patent [19] [11] 4,089,558
Banerjea et al. [45] May 16, 1978

[54] ROOF SYSTEM FOR VANS

[75] Inventors: Tara N. Banerjea, Warren; Donald B. Stinson, Jr., Farmington, both of Mich.

[73] Assignee: Fruehauf Corporation, Detroit, Mich.

[21] Appl. No.: 814,411

[22] Filed: Jul. 11, 1977

[51] Int. Cl.² .............................................. B62d 31/02
[52] U.S. Cl. ................................................. 296/137 R
[58] Field of Search ....................... 296/137 R, 28 M; 72/365, 378; 113/116 C

[56] References Cited

U.S. PATENT DOCUMENTS

| 2,036,555 | 4/1936 | Thompson | 296/137 R |
| 3,034,824 | 5/1962 | Schubach | 296/28 M |
| 3,061,364 | 10/1962 | Tantlinger | 296/137 R |
| 3,827,137 | 8/1974 | Schubach | 296/137 R |

Primary Examiner—Robert R. Song
Attorney, Agent, or Firm—Harness, Dickey & Pierce

[57] ABSTRACT

The disclosure relates to a support structure for a thin sheet metal roof skin for an over-the-road trailer or van. The roof skin is supported on transverse roof bows which are secured to side rails mounted on the top of side wall posts. The bows are of slightly convex form and are of V-section at the center to maximize strength and minimize snagging. The bows are formed to a unique configuration at the ends and are secured by rivets to the rails. The attachment edge of the skin is vertically spaced from the ends of the bows so as to reduce vibration and stress transfer from the skin to the top of the posts.

7 Claims, 9 Drawing Figures

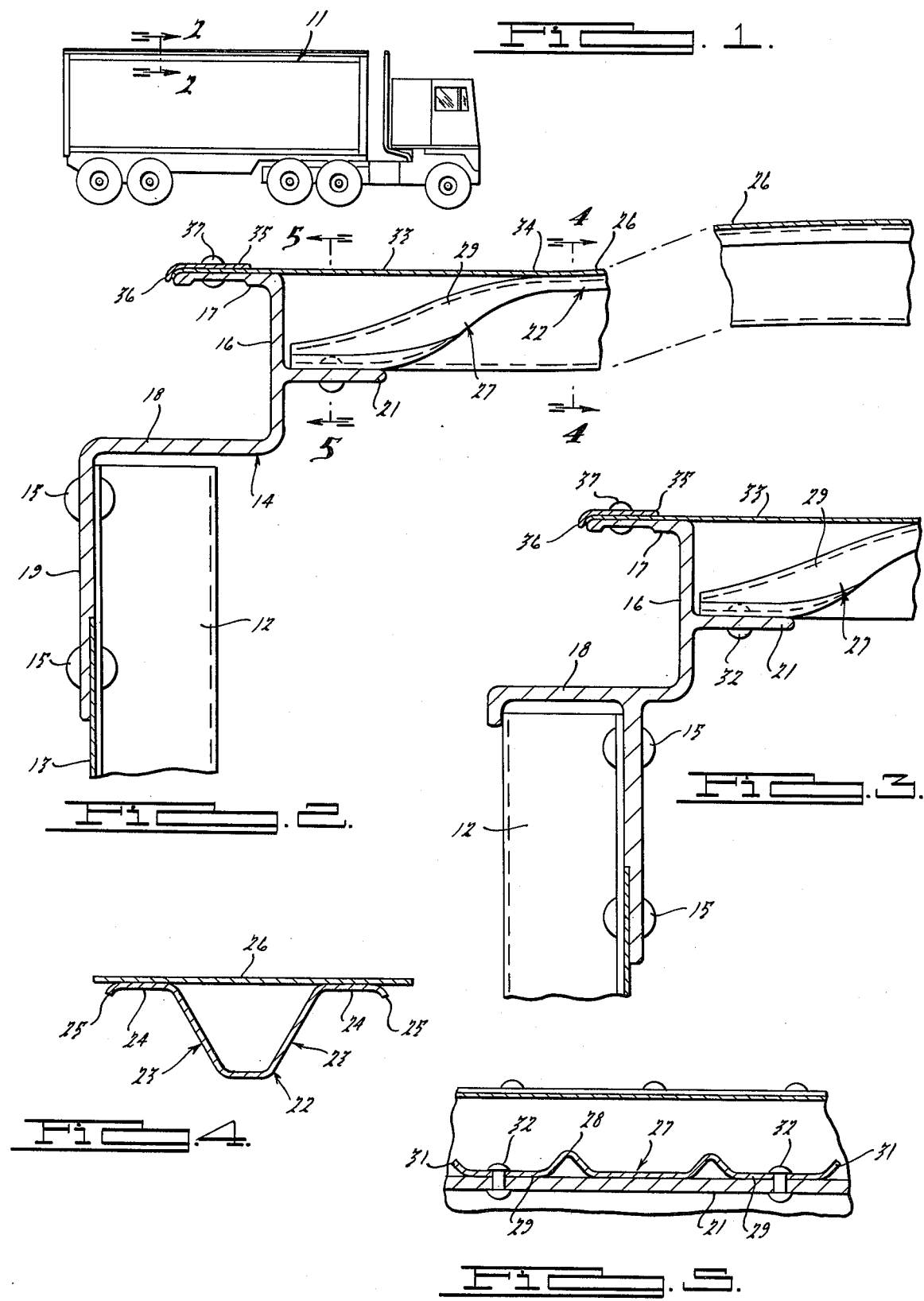

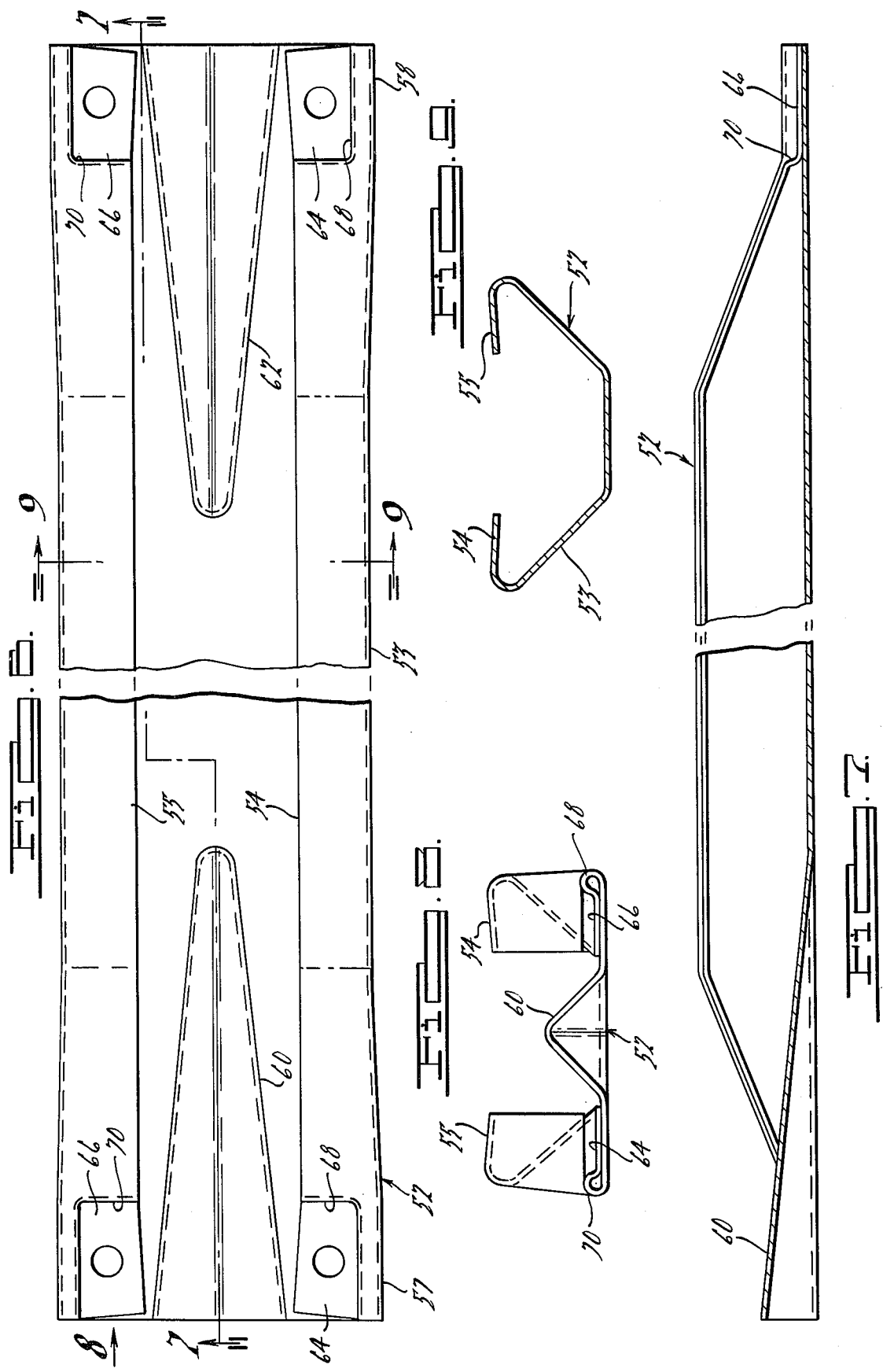

ROOF SYSTEM FOR VANS

BACKGROUND OF THE INVENTION

Reference may be had to the following patents which were developed in a preliminary novelty search and which disclose art having a bearing on the present invention:
U.S. Pat. No. 2,138,084
U.S. Pat. No. 2,148,318
U.S. Pat. No. 2,194,902
U.S. Pat. No. 2,355,794

SUMMARY OF THE INVENTION

The invention relates to an orientation and configuration of structural elements used to attach a flat sheet metal roof skin to the upper side rails of an over-the-road trailer or van. The upper side rails are riveted to the tops of posts to which similar metal sheets are secured. The upper side rail is of outwardly presenting channel section, the bottom flange thereof extending downwardly and riveted to the inner or outer faces of the posts, as desired. A flange also extends inwardly from the web of the upper side rail for supporting roof bows which extend transversely of the longitudinal axis of the trailer or van. The bows are of V-cross-section, edge flanges at the top of the V-section being directed inwardly or outwardly. The bows are of slightly convex shape, the ends of which are formed to a unique configuration and riveted to the inwardly directed flanges on the web of the upper side rails. The thin sheet metal roof skin follows the contour of the bows except at the ends thereof where the bows drop downwardly for attachment to the flange on the upper side rail.

The roof skin extends outwardly beyond and in spaced relation above the bow ends to rest upon top flanges of the upper side rails. Narrow retention strips extend along each edge of the roof sheet and are riveted thereto and to the top flange of the upper side rail in the conventional manner. The construction of the instant invention solves the problems incident to:
(a) vibration due to flutter of the roof skin;
(b) stress reversals in the roof skin due to parallelogramming of the skin in a horizontal plane;
(c) stress reversals in the roof skin due to parallelogramming of the vehicle body in vertical section; and
(d) column loading of the roof bows due to pickup equipment.

BRIEF DESCRIPTION OF THE DRAWINGS

FIG. 1 is a side view in elevation of a tractor attached to a van which embodies features of the present invention;

FIG. 2 is an enlarged broken sectional view of the van illustrated in FIG. 1, taken on a line 2—2 thereof, with the side sheets disposed on the outer faces of the supporting posts and the bows broken to show camber;

FIG. 3 is a view of structure, similar to that illustrated in FIG. 2, with the side sheets disposed on the inside faces of the supporting posts;

FIG. 4 is a sectional view of the structure illustrated in FIG. 2 taken on the line 4—4 thereof;

FIG. 5 is a sectional view of the structure illustrated in FIG. 2 taken on the line 5—5 thereof;

FIG. 6 is a top view of a modified roof bow;

FIG. 7 is an enlarged sectional view of the roof bow illustrated in FIG. 6, taken on a line 7—7 thereof;

FIG. 8 is a view of the structure illustrated in FIG. 6 taken in the direction of the arrow 8;

FIG. 9 is a sectional view of the structure illustrated in FIG. 6 taken on the line 9—9 thereof.

DESCRIPTION OF THE PREFERRED EMBODIMENT

Referring to the drawings, FIGS. 1 and 2 show an over-the-road trailer 11 comprising vertical posts 12 which extend upwardly from the floor of the trailer 11 to support a thin sheet metal side wall skin 13 which is secured to the posts 12 by rivets 15. A top side rail 14 is also secured to the posts 12 by rivets 15. The top side rail 14 is of channel section comprising a web 16, a horizontal top flange 17, and a horizontal bottom flange 18 from which a flange 19 depends downwardly. The web 16 has a horizontal flange 21 extending inwardly therefrom to which the ends of a plurality of transversely disposed roof bows 22 are secured.

As seen in FIG. 4, a central portion 23 of the bows 22 is of V-shaped cross section having laterally outwardly extending flanges 24 which are angularly related to a roof skin 26 of thin sheet metal. The flanges 24 have outer edges 25 which are deflected downwardly to present a rounded surface to the roof skin 26 on the occurrence of flutter. The lateral flanges 24 are connected to the under surface of the roof skin 26 by epoxy or similar adhesive material which is accommodated in the space between the skin 26 and the flanges 24.

As seen in FIGS. 2 and 3, the ends 27 of the bows 22 are formed so as to be deflected downwardly, an intermediate portion between the ends being arched to provide a slight camber to the roof skin 26. The deflected ends 27 are flattened to the form illustrated in FIG. 5 to enhance flexibility of the ends consistent with maintaining columnar strength in the remainder of the bow 22. Ribs 28 are provided at the ends 27 of the roof bows 22 to minimize fatigue failure due to flexure of the ends 27 relative to the center portion of the bow 22 and to provide columnar strength to bow ends at the attachment point thereof. The flanges 24 are laterally flattened at 29 edge portion 31 projecting upwardly. The flattened flange portion 29 is secured to the flange 21 of the top rail 14 at both sides of the van 11 as by rivets 32.

It will be noted in FIG. 2 that the roof skin 26 has the side edge portions 33 thereof spaced above the ends 27 of the bows 22 to separate the skin 26 from the bows 22 outwardly from an arcuate fulcrum point 34 thereby minimizing the effect of the roof skin flutter on the skin 26 and the transfer of such flutter to the posts 12. The outer edge of the skin 26 rests upon the top flange 17 of the upper rail 14, a metal strip 35 overlying the outer edge and extending downwardly at 36 along the curved edge of the upper rail flange 17. The skin 26, the strip 35, and the flange 17 are all secured in fixed relation to each other by a plurality of spaced rivets 37.

In accordance with the present invention, vibration or flutter occurring in the roof skin 26 will be accepted by the relatively stiff bows between fulcrum points 34 but will be substantially dampened outwardly thereof due to the spacing of the skin 26 from the ends 27 of the bows 23 and the flexibility of the bow ends 27. In this manner, fatigue and splitting of the posts tops due to transfer of vibration from the roof skin 26 to the top rail 14 and posts 12 is minimized.

Stated in another manner, the transfer of flutter of the roof skin 26 is dampened sufficiently to reduce damage to the damage to the juncture of posts 12 with the side rails 14. Experience has demonstrated that a 0.032 inch thick sheet metal can be used with the disclosed construction as opposed to .040 inch material heretofore required.

Referring to FIGS. 6 through 9, a modified roof bow 52 comprises a central portion 53 of V-shaped cross section having laterally inwardly extending flanges 54 and 55 at the upper side edges thereof. The flanges 54 and 55 are deflected downwardly to accommodate an epoxy or similar adhesive material to effect connection of the bow 52 to the under surface of a roof skin.

As seen in FIGS. 6 and 7, the ends 57 and 58 of the bows 52 are deflected downwardly, the portion 53 therebetween providing a slight camber to the roof skin. The deflected ends 57 and 58 formed as illustrated in FIGS. 6 and 7 to enhance columnar rigidity of the ends yet provide for controlled flexibility of the bow ends 57 and 58 relative to the center portion 53 thereof to dampen vibration transfer from the roof skin to the bow ends 57 and 58. Central ribs 60 and 62 are provided in the ends 57 and 58 of the roof bows 53 to rigidify the attachment point thereof, the flanges 54 and 55 being downwardly flattened at 64 and 66. The flattened portions 64 and 66 are secured to the flanges 21 of the top rail 14 at both sides of the van 11 as by rivets 32, as described hereinbefore.

It is to be noted that the flattened end portions 64 and 66 of the ribs 54 and 56 are provided with upstanding shoulders of beads 68 and 70 which stiffen the attachment areas 64 and 66.

From the foregoing it should be apparent that the roof skin in both embodiments has its side edge portions thereof spaced above the ends of the bows to separate the skin from the bows outwardly from four fulcrum points on the roof bows. Thus, vibration occurring in the roof skin will be accepted by the relatively stiff bows between the fulcrum points on the bows but will be substantially dampened outwardly thereof due to the spacing of the skin from the ends of the bows and the flexibility of the bow ends. In this manner, fatigue and splitting of the post tops due to transfer of vibration from the roof skin to the top rail and posts is minimized.

Stated in another manner, the transfer of flutter of the roof skin is dampened sufficiently by the unique construction of the roof bows to reduce damage to the juncture of the posts with the top rails.

While it will be apparent that the invention herein disclosed is well calculated to achieve the benefits and advantages as hereinabove set forth, it will be appreciated that the invention is susceptible to modification, variation and change without departing from the spirit thereof.

What is claimed:

1. A roof and sidewall system for an over-the-road trailer or van comprising a pair of side walls having a plurality of vertical side wall posts, a pair of longitudinally extending top rails on said side walls having downwardly extending flanges overlying the upper ends of said posts and secured thereto, said top rails having lower horizontally extending flanges and upper horizontally extending flanges in vertically spaced relation above said lower flanges, a plurality of sheet metal roof bows extending laterally between said top rails and secured to the lower flanges thereof, a roof skin extending across the top of said roof bows and secured to the upper flanges of said top rails, the end portions of said roof bows being flattened downwardly to provide an air gap between the point of attachment thereof to the lower flanges of said top rails and the point of attachment of said roof skin to the upper flange of said top rail thereby to minimize the transfer of flutter of said roof skin to said vertical posts.

2. A roof and sidewall system as recited in claim 1 wherein the roof bows are of V-shaped cross section.

3. A system as recited in claim 2 wherein said roof bows have inwardly directed edge flanges.

4. A system as recited in claim 2 wherein said roof bows have outwardly directed edge flanges.

5. A system as recited in claim 3 or 4 wherein said flanges are angularly related to said roof skin to provide a space for the accommodation of an adhesive, and an adhesive in said space.

6. A system as recited in claim 1 wherein the end portion of said bows have an upwardly extending inverted V-shaped rib.

7. A system as recited in claim 1 wherein the end portions of said roof bows are flattened so as to present areas of double metal thickness at the point of attachment thereof to said top rails, said area being surrounded by an upstanding reinforcement rib.

* * * * *